United States Patent
Suzuki et al.

(10) Patent No.: US 10,054,332 B2
(45) Date of Patent: Aug. 21, 2018

(54) AIR-CONDITIONING REGISTER

(71) Applicants: TOYODA GOSEI CO., LTD., Kiyosu-si, Aichi-ken (JP); TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventors: Kazushige Suzuki, Kiyosu (JP); Yasuyuki Mitsui, Kiyosu (JP); Masaki Otake, Kiyosu (JP); Masayuki Komatsu, Kariya (JP); Yuya Inagaki, Kariya (JP); Yusuke Katsuno, Kariya (JP)

(73) Assignees: TOYODA GOSEI CO., LTD., Aichi-pref. (JP); TOYOTA JIDOSHA KABUSHIKI KAISHA, Toyota-shi (JP); KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 437 days.

(21) Appl. No.: 14/703,087

(22) Filed: May 4, 2015

(65) Prior Publication Data
US 2015/0328959 A1 Nov. 19, 2015

(30) Foreign Application Priority Data
May 14, 2014 (JP) .................................. 2014-100412

(51) Int. Cl.
*F24F 13/15* (2006.01)
*B60H 1/34* (2006.01)

(52) U.S. Cl.
CPC ........... *F24F 13/15* (2013.01); *B60H 1/3421* (2013.01); *B60H 2001/3471* (2013.01); *B60H 2001/3492* (2013.01)

(58) Field of Classification Search
CPC ............. A47G 25/90; B60H 1/3421; B60H 2001/3471; B60H 2001/3492; F24F 13/15
(Continued)

(56) References Cited

U.S. PATENT DOCUMENTS 4,796,518 A * 1/1989 Murray ................ B60H 1/3421
454/155
5,338,252 A * 8/1994 Bowler ................ B60H 1/3421
454/155
(Continued)

FOREIGN PATENT DOCUMENTS

GB 2196421 A * 4/1988 ........... B60H 1/3421
JP 2009-051282 A 3/2009
JP 2009051282 A * 3/2009

OTHER PUBLICATIONS

Office Action dated Aug. 23, 2016 issued in corresponding JP patent application No. 2014-100412 (and English translation).

*Primary Examiner* — Alissa Tompkins
*Assistant Examiner* — Frances F Hamilton
(74) *Attorney, Agent, or Firm* — Posz Law Group, PLC

(57) ABSTRACT

First and second upstream fins and first and second downstream fins are arranged in the air passage of air-conditioning air to pivot. The first upstream fin includes an upstream body with a cutout extending upstream from the downstream edge. A transmission shaft, which extends along upstream fin shafts, is arranged in the cutout. The first downstream fin includes a downstream body with a slidable operation knob. The operation knob includes a fork that is rotationally supported with a support shaft. The fork includes a pair of transmission pieces, which extends upstream from the
(Continued)

operation knob and sandwiches the transmission shaft. The transmission shaft includes a pair of stoppers, which is located at positions that are spaced from each other in the extending direction of the transmission shaft and that sandwich the transmission pieces. The stoppers are caused to contact the transmission pieces by operation of the operation knob.

2 Claims, 8 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 5,480,350 A * | 1/1996 | Naruse | ................ | B60H 1/3421 454/155 |
| 9,073,407 B2 * | 7/2015 | Kober | ................ | B60H 1/3414 |
| 9,539,882 B2 * | 1/2017 | Takai | ................ | B60H 1/3421 |
| 9,555,692 B2 * | 1/2017 | Shibata | ............... | B60H 1/3421 |
| 9,764,622 B2 * | 9/2017 | Noichl | ................ | B60H 1/3421 |
| 2001/0031619 A1 * | 10/2001 | Yabuya | ................ | B60H 1/3421 454/155 |
| 2002/0178744 A1 * | 12/2002 | Tanabe | ................ | B60H 1/3421 62/407 |
| 2004/0092225 A1 * | 5/2004 | Gehring | ............... | B60H 1/3421 454/155 |
| 2004/0171344 A1 * | 9/2004 | Krause | ................ | B60H 1/3421 454/315 |
| 2006/0014485 A1 * | 1/2006 | Sousa | ................ | B60H 1/3421 454/315 |
| 2007/0111653 A1 * | 5/2007 | Endou | ................ | B60H 1/3421 454/155 |
| 2008/0119124 A1 * | 5/2008 | Okuno | ................ | B60H 1/3428 454/69 |
| 2009/0286462 A1 * | 11/2009 | Goto | ................ | B60H 1/3428 454/155 |
| 2010/0093269 A1 * | 4/2010 | Sakaguchi | ........... | B60H 1/3421 454/154 |

* cited by examiner

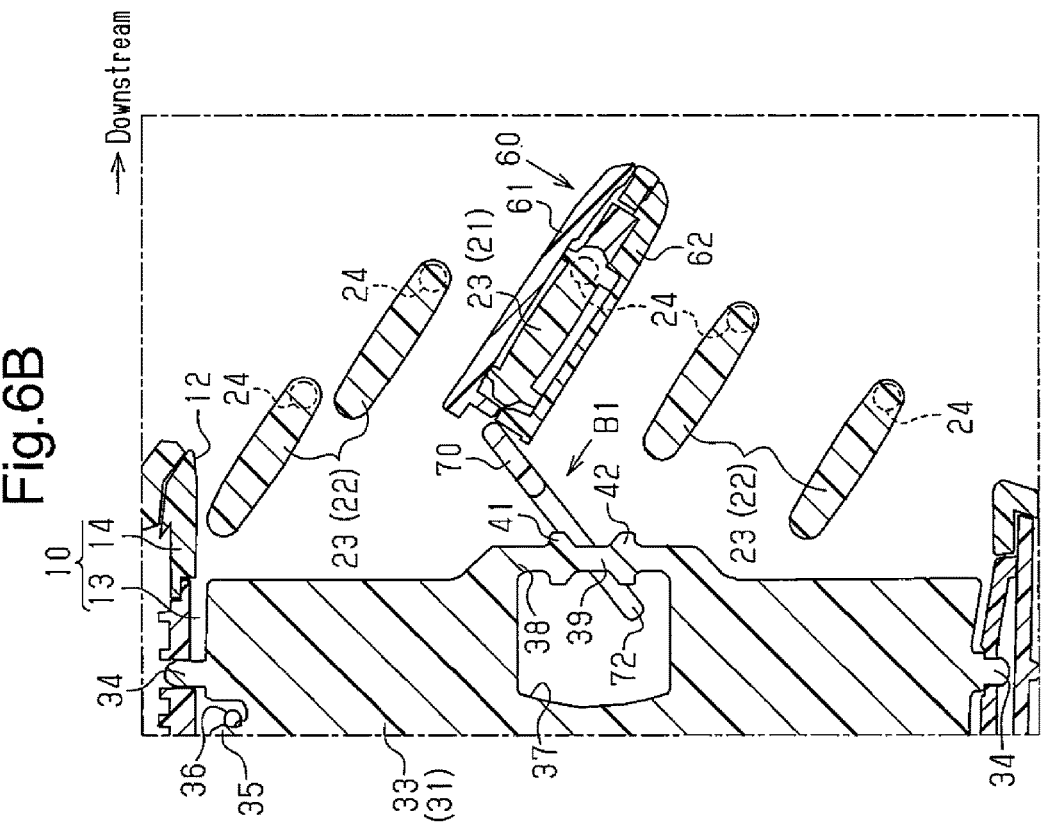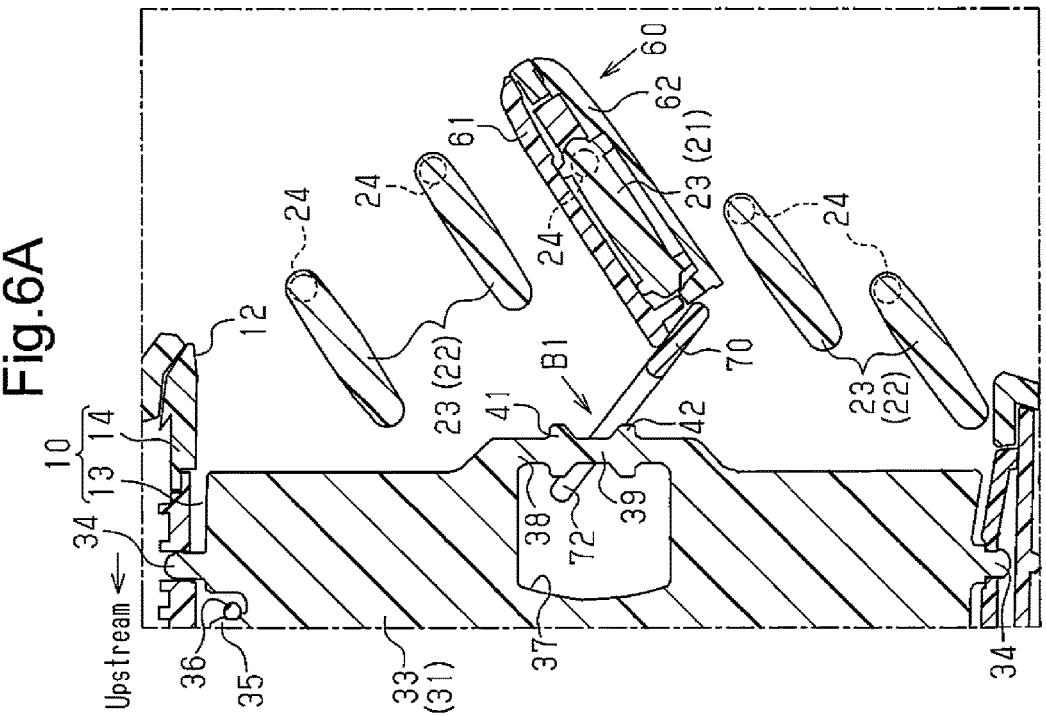

AIR-CONDITIONING REGISTER

BACKGROUND OF THE INVENTION

The present invention relates to an air-conditioning register having fins to change the flow direction of air-conditioning air supplied from an air conditioner and delivered into the passenger compartment.

FIGS. 11 and 12 show an example of such an air-conditioning register for a vehicle.

The air-conditioning register includes a downstream fin 82 and an upstream fin 85, which are arranged in an air passage 81 of air-conditioning air A1. The downstream fin 82 includes a downstream body 83 and a downstream fin shaft 84, which each extend in a direction crossing the flow direction of the air-conditioning air A1. The downstream fin 82 is supported to pivot about the downstream fin shaft 84. The upstream fin 85 includes an upstream body 86 and an upstream fin shaft 87, which each extend in a direction crossing both the flow direction and the extending direction of the downstream fin shaft 84. The upstream fin 85 is supported upstream of the downstream fin 82 to pivot about the upstream fin shaft 87. An operation knob 95 (refer to a long dashed double-short dashed line in FIG. 11) is arranged on the downstream body 83 to slide in the extending direction of the downstream body 83.

A cutout 88 is formed for transmitting the sliding movement of the operation knob 95 to the upstream body 86 to pivot the upstream fin 85 about the upstream fin shaft 87. The cutout 88 extends upstream from the downstream edge of the upstream body 86. A transmission shaft 89, which extends along the upstream fin shaft 87, is arranged in the cutout 88. A fork 96 is rotationally coupled to the operation knob 95 with a support shaft 98. The support shaft 98 is press-fitted to the operation knob 95 to be frictionally engaged with the operation knob 95. The fork 96 has a pair of transmission pieces 97, which extends upstream from the operation knob 95 and sandwiches the transmission shaft 89. The upstream body 86 includes two flanges 91 in portions that border the cutout 88. The flanges 91 are located to face each other in the extending direction of the transmission shaft 89. Each flange 91 bulges from opposite sides in the thickness direction of the upstream body 86.

For example, Japanese Laid-Open Patent Publication No. 2009-51282 discloses an air-conditioning register with the fork 96, which rotates relative to the operation knob 95 in the above-described manner.

In the above-illustrated air-conditioning register, when the operation knob 95 is operated in a first direction in the thickness direction to pivot the downstream fin 82, the support shaft 98 rotates around the downstream fin shaft 84, and the fork 96 moves along the transmission shaft 89 while maintaining the orientation. If the operation of the operation knob 95 in the first direction continues even after the fork 96 contacts the corresponding flange 91, the angle of the fork 96 in relation to the operation knob 95 changes.

In this state, if the operation knob 95 is operated in a second direction, which is the direction opposite to the first direction in the thickness direction of the operation knob 95, the fork 96 moves along the transmission shaft 89 in the second direction while maintaining the orientation, which has been changed by contacting the corresponding flange 91.

The above-illustrated air-conditioning register can change the angle of the fork 96 with contact between the fork 96 and the flange 91. This allows the cutout 88 to be smaller than that of an air-conditioning register with a fork 96 that does not rotate relative to an operation knob 95. Thus, the likelihood is limited that the cutout 88 will reduce the directionality of air-conditioning air A1, which is defined by the upstream fin 85. In addition, the likelihood is limited that the visible cutout 88 will worsen the appearance.

However, the conventional air-conditioning register changes the angle of the fork 96 with the contact between the fork 96 and the flange 91. When the operation knob 95 is operated in the thickness direction to pivot the downstream fin 82, the transmission piece 97 strongly strikes the flange 91. This may produce a loud tapping noise.

SUMMARY OF INVENTION

Accordingly, it is an objective of the present invention to provide an air-conditioning register capable of reducing the tapping noise of a fork produced by operation of an operation knob for pivoting a downstream fin.

To achieve the above objective, an air-conditioning register includes a downstream fin, an upstream fin, an operation knob, a fork, and a pair of stoppers. The downstream fin includes a downstream body and a downstream fin shaft, which each extend in a direction crossing a flow direction of air-conditioning air. The downstream fin is supported to pivot about the downstream fin shaft. The upstream fin includes an upstream body and an upstream fin shaft, a cutout, and a transmission shaft. The upstream body and the upstream fin shaft each extend in a direction that crosses both the flow direction and the extending direction of the downstream fin shaft. The cutout is formed in the upstream body to extend upstream from a downstream edge of the upstream body. The transmission shaft is located in the cutout to extend along the upstream fin shaft. The upstream fin is located upstream of the downstream fin and supported to pivot about the upstream fin shaft. The operation knob is arranged to slide relative to the downstream body in the extending direction of the downstream body. The fork includes a pair of transmission pieces that extends upstream from the operation knob and sandwiches the transmission shaft. The fork is supported with a support shaft to be rotational relative to the operation knob. The stoppers are arranged on the transmission shaft. The stoppers are spaced from each other in the extending direction of the transmission shaft and located at positions that sandwich the transmission pieces. The stoppers are caused to contact the transmission pieces by operation of the operation knob.

In the above-illustrated configuration, the operation knob is operated in the thickness direction to pivot the downstream fin. With the operation, the support shaft rotates around the downstream fin shaft, and the fork moves along the transmission shaft. With the movement, the transmission pieces of the fork contact one of the stoppers according to the operating direction of the operation knob. Since the stoppers are arranged at locations that sandwich the transmission pieces on the transmission shaft, the movable range for the transmission pieces is smaller than that in a case in which flanges are arranged in portions of the upstream body that border the cutout. This inhibits the transmission pieces from strongly striking the corresponding stopper with the operation of the operation knob and reduces the tapping noise produced by the contact.

BRIEF DESCRIPTION OF THE DRAWINGS

FIG. 4 is a cross-sectional view showing a part of the air-conditioning register of FIG. 1, illustrating the positional relationship among a transmission shaft, stoppers, transmission pieces of a fork, and the like;

FIG. 6A and FIG. 6B are cross-sectional side views showing a part of the air-conditioning register when the operation knob that has been in the state of FIG. 5B is operated in the thickness direction to pivot a downstream fin;

DESCRIPTION OF EMBODIMENTS

First Embodiment

An air-conditioning register for a vehicle according to a first embodiment will now be described with reference to FIGS. 1 to 6B.

In the following, the direction in which the vehicle advances forward will be referred to as the front. The reverse direction will be referred to as the rear. The direction of the height will be referred to as a vertical direction.

Figure 3:
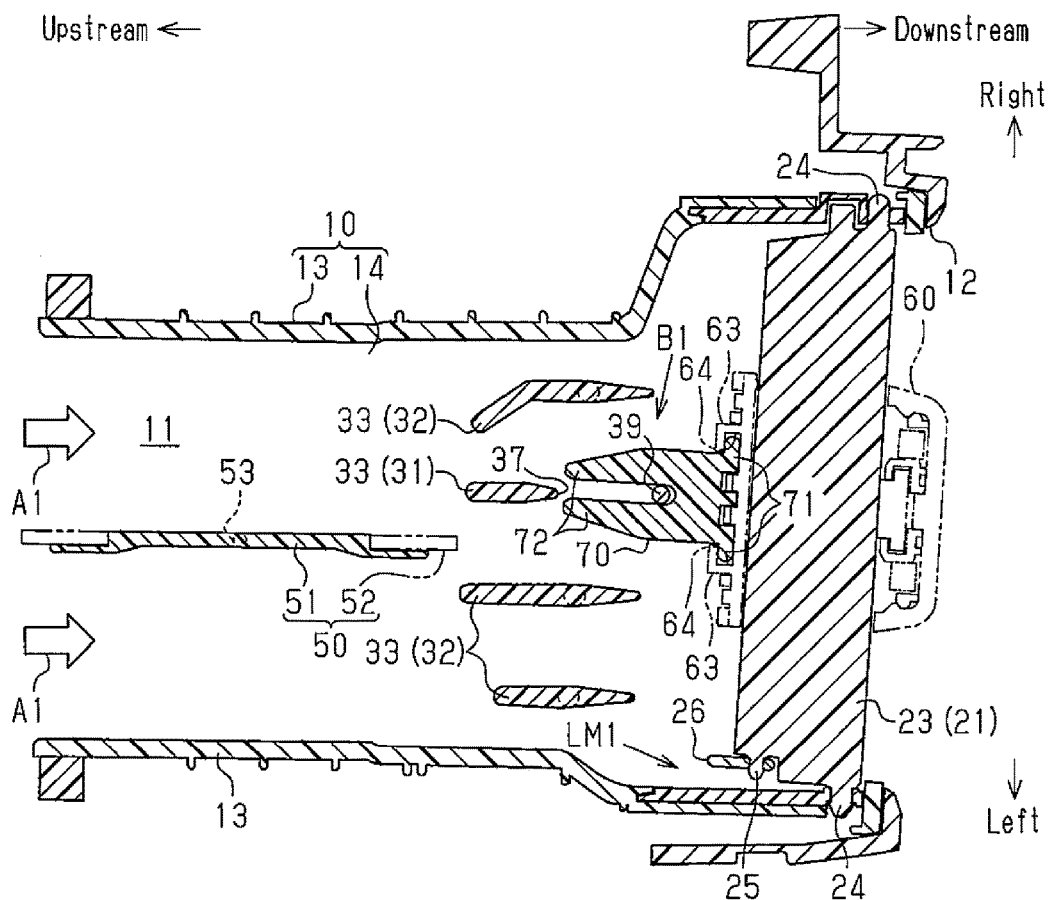
FIG. 3 is a cross-sectional side view of the air-conditioning register of FIG. 1.
Figure 5A:
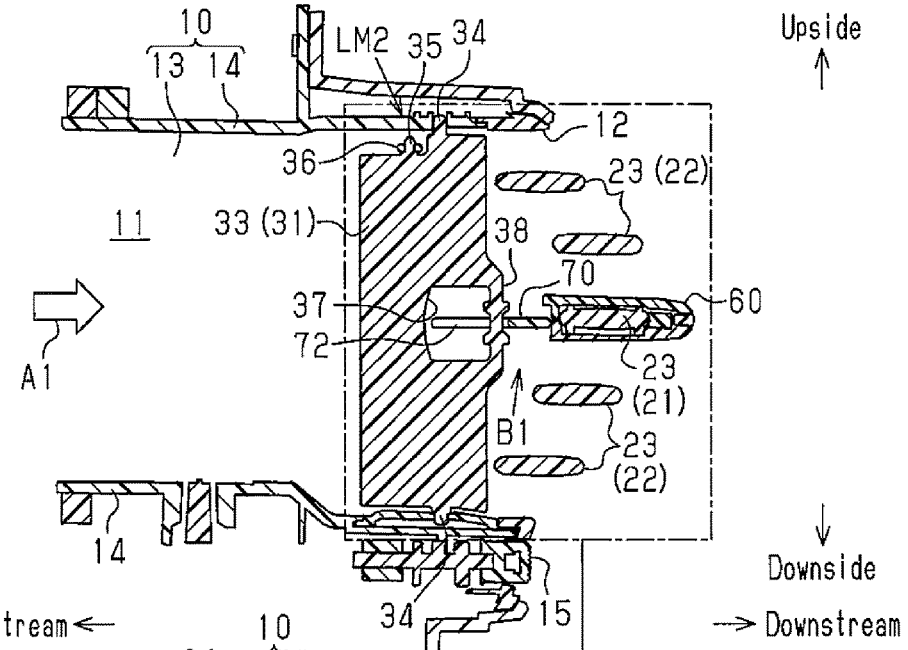
FIG. 5A is a cross-sectional side view of the air-conditioning register of FIG. 1.

In a passenger compartment, an instrument panel (not shown) is arranged forward of the front seats (the driver's seat and a front passenger seat) of the vehicle. The instrument panel incorporates air-conditioning registers, which are arranged, e.g., in the middle part and on the opposite sides in the vehicle widthwise direction. As shown in FIG. 3 and FIG. 5A, the air-conditioning register includes a case 10, first and second upstream fins 31 and 32, first and second downstream fins 21 and 22, a shut-off damper 50, an operation knob 60, and a transmission mechanism B1. Each component of the air-conditioning register will be described.

<Case 10>

As shown in FIG. 3, the case 10 includes a plurality of members and has a tubular shape with open opposite ends. The internal space of the case 10 includes a passage (hereinafter, referred to as an "air passage 11") for air-conditioning air A1 (warm air or cool air) supplied from an air conditioner (not shown). The side close to the air conditioner is the upstream side and the side distant from the air conditioner is the downstream side in the flow direction of the air-conditioning air A1 in the air passage 11. The downstream end of the air passage 11 includes an outlet port 12 for the air-conditioning air A1 (refer to FIG. 1). The air passage 11 is surrounded by four walls of the case 10. The four walls are a pair of vertical walls 13, which faces each other in the vehicle widthwise direction, and a pair of lateral walls 14, which faces each other in the vertical direction.

<First and Second Downstream Fins 21 and 22>

Figure 5B:
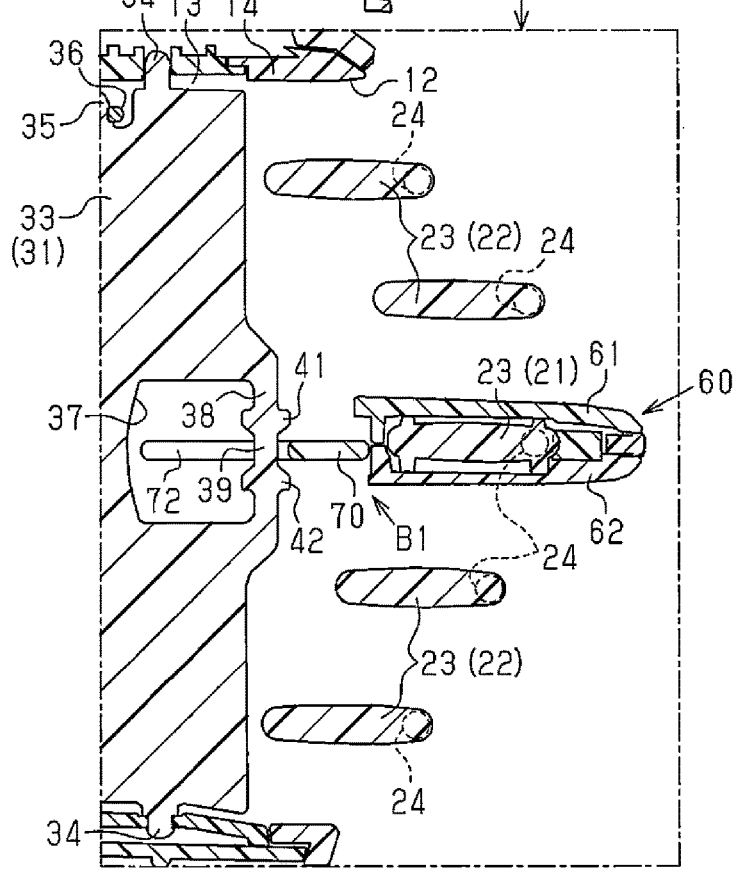
FIG. 5B is an enlarged cross-sectional side view showing a part of FIG. 5A.

As shown in FIG. 3 and FIGS. 5A and 5B, the first and second downstream fins 21 and 22 each include a plate-like downstream body 23 and a pair of downstream fin shafts 24. The downstream body 23 and the downstream fin shafts 24 extend in the vehicle widthwise direction, which is a direction crossing the flow direction of the air-conditioning air A1. The first and second downstream fins 21 and 22 are arranged in the upstream vicinity of the outlet port 12 in the air passage 11 and spaced from one another in the vertical direction.

One of the first and second downstream fins 21 and 22 that is located in the vertical middle part is a first downstream fin 21. The others are second downstream fins 22.

The downstream fin shafts 24 project from the respective opposite end surfaces in the vehicle widthwise direction of each of the first and second downstream fins 21 and 22. The first and second downstream fins 21 and 22 are each supported by the vertical walls 13 with the downstream fin shafts 24. This allows the first and second downstream fins 21 and 22 to pivot about the respective downstream fin shafts 24.

Each downstream body 23 includes a coupling shaft 25 that is arranged in parallel to the downstream fin shafts 24. The coupling shaft 25 is located at a position displaced upstream from the left downstream fin shaft 24 (the lower downstream fin shaft 24 as viewed in FIG. 3). The coupling shafts 25 of the first and second downstream fins 21 and 22 are coupled together by an elongated coupling rod 26, which extends substantially in the vertical direction. The downstream bodies 23, the downstream fin shafts 24, the coupling shafts 25, the coupling rod 26, and the like constitute a first link mechanism LM1 so that all the second downstream fins 22 pivot in synchronization with the first downstream fin 21.

<First and Second Upstream Fins 31 and 32>

The first and second upstream fins 31 and 32 each include a plate-like upstream body 33 and a pair of upstream fin shafts 34. The upstream body 33 and the upstream fin shafts 34 each extend in the vertical direction, which crosses both the flow direction of the air-conditioning air A1 and the extending direction of the downstream fin shafts 24. The first and second upstream fins 31 and 32 are arranged upstream of the first and second downstream fins 21 and 22 in the air passage 11 and spaced from one another in the vehicle widthwise direction.

One of the first and second upstream fins 31 and 32 that is located in the middle part in the vehicle widthwise direction is a first upstream fin 31. The others are second upstream fins 32.

The upstream fin shafts 34 project from the respective opposite end surfaces in the vertical direction of each of the first and second upstream fins 31 and 32. The first and second upstream fins 31 and 32 are each supported by the lateral walls 14 with the upstream fin shafts 34. This allows the first and second upstream fins 31 and 32 to pivot about the respective upstream fin shafts 34.

As shown in FIGS. 5A and 5B, each upstream body 33 includes a coupling shaft 35 that is arranged in parallel to the upstream fin shafts 34. The coupling shaft 35 is located at a position displaced upstream from the upper upstream fin shaft 34. The coupling shafts 35 of the first and second upstream fins 31 and 32 are coupled together by an elongated coupling rod 36, which extends substantially in the vehicle widthwise direction. The upstream bodies 33, the upstream fin shafts 34, the coupling shafts 35, the coupling rod 36, and the like constitute a second link mechanism LM2 so that all the second upstream fins 32 pivot in synchronization with the first upstream fin 31.

<Shut-Off Damper 50>

As shown in FIG. 3, the shut-off damper 50 includes a plate-like body 51 and a sealing portion 52, which is placed around the body 51. The shut-off damper 50 is arranged upstream of the first and second upstream fins 31 and 32. A pair of shafts 53 projects from the opposite end surfaces in the vertical direction of the body 51. The shut-off damper 50 is supported by the lateral walls 14 with the shafts 53. This allows the shut-off damper 50 to pivot between at an open position and a closed position.

The shut-off damper 50 at the open position is substantially in parallel to the vertical walls 13 to widely open the air passage 11 (refer to FIG. 3). The shut-off damper 50 at the closed position is largely inclined in relation to the vertical walls 13, and the sealing portion 52 contacts the lateral walls 14 and the vertical walls 13 to close the air passage 11.

<Operation Knob 60>

Figure 1:
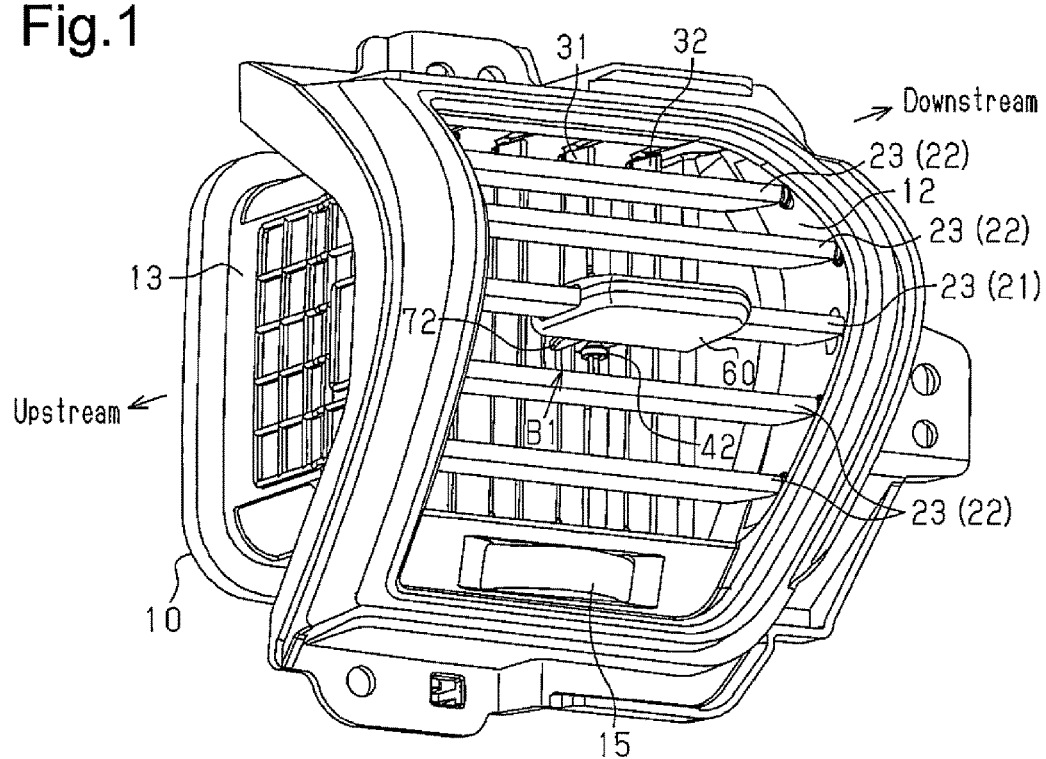
FIG. 1 is a perspective view of an air-conditioning register according to a first embodiment, in which an operation knob is arranged horizontally.

FIG. 1 and FIG. 5B show the operation knob 60, which is a member that an occupant operates to change the flow direction of the air-conditioning air A1 delivered from the outlet port 12. The operation knob 60 includes an upper case 61 and a lower case 62, which sandwich a portion of the downstream body 23 of the first downstream fin 21 from above and below. One of the upper case 61 and the lower case 62 is secured to the other to mount the operation knob 60 to the downstream body 23. This allows the operation knob 60 to slide in the extending direction of the downstream body 23, i.e., the vehicle widthwise direction. The operation knob 60 with the first downstream fin 21 is pivotal about the downstream fin shafts 24. The operation knob 60 is movable in the vehicle widthwise direction by sliding on the downstream body 23.

<Transmission Mechanism B1>

The transmission mechanism B1 is configured to transmit sliding movement of the operation knob 60 to the first upstream fin 31 to pivot the first upstream fin 31 about the upstream fin shafts 34.

Figure 2:
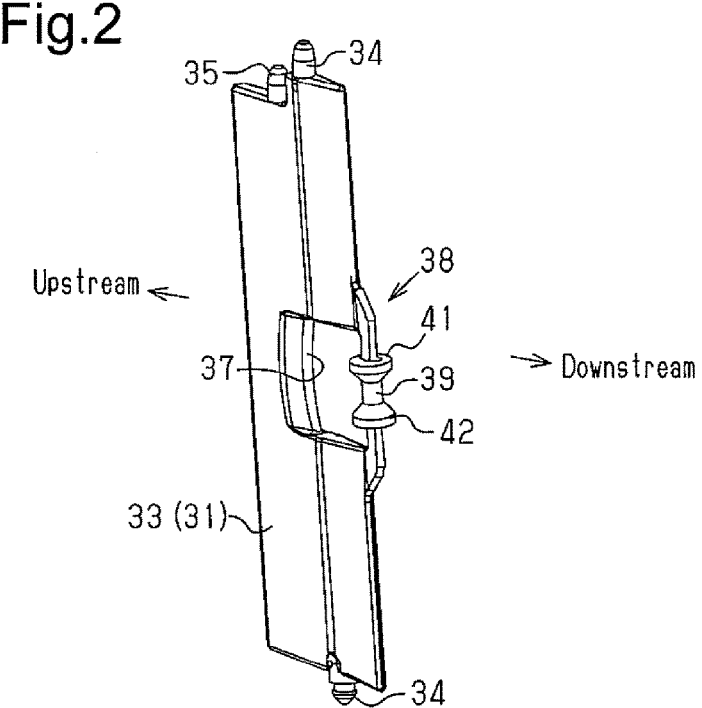
FIG. 2 is a perspective view of an upstream fin located in the middle part of the air-conditioning register of FIG. 1.

As shown in FIG. 2 and FIG. 5B, the upstream body 33 of the first upstream fin 31 includes a cutout 37 formed in the middle part in the vertical direction to extend upstream from the downstream edge. The cutout 37 is for inhibiting the pivoted first upstream fin 31 from contacting a fork 70, which will be described below.

The cutout 37 includes a transmission shaft 38, which extends along the upstream fin shafts 34 in the vertical direction. In the first embodiment, the transmission shaft 38 is arranged at the downstream end of the cutout 37. The transmission shaft 38 includes a columnar body shaft 39 in the middle part in the extending direction.

The cutout 37 and the transmission shaft 38 are not provided for the second upstream fins 32.

As shown in FIG. 3, the operation knob 60 is coupled to the fork 70. The fork 70 includes a pair of support shafts 71 arranged at the downstream end. The support shafts 71 extend along the downstream fin shafts 24. The support shafts 71 are press-fitted to a shaft hole 64 of a bearing 63, which is a part of the operation knob 60, and are frictionally engaged with the shaft hole 64.

The fork 70 has a pair of transmission pieces 72, which extends upstream from the operation knob 60. The transmission pieces 72 are spaced from each other in the extending direction of the downstream fin shafts 24. The space between the transmission pieces 72 is set to be slightly larger than the diameter of the body shaft 39.

Figure 4:
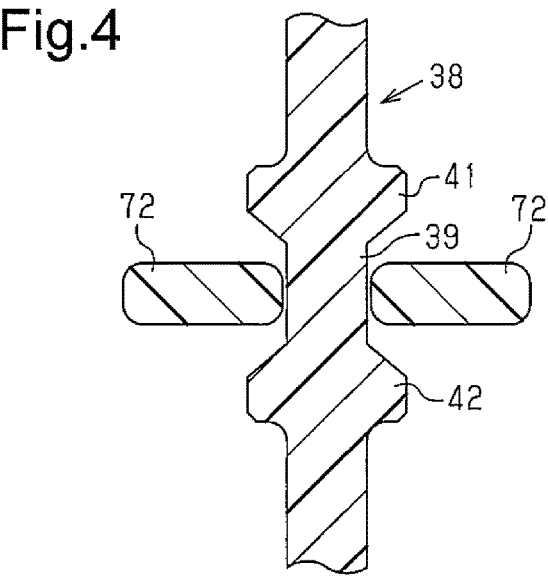

As shown in FIG. 2 and FIG. 4, the transmission shaft 38 includes a first stopper 41 and a second stopper 42. The first stopper 41 and the second stopper 42 are located to be spaced from each other in the extending direction of the transmission shaft 38, i.e., substantially in the vertical direction, and to sandwich the transmission pieces 72 from above and below. In the first embodiment, the first and second stoppers 41 and 42 are continuous to the upper end and the lower end of the body shaft 39 respectively to be close to each other. The space between the first and second stoppers 41 and 42 is set to be slightly larger than the vertical thicknesses of the transmission pieces 72, and the first and second stoppers 41 and 42 are close to the transmission pieces 72. The first and second stoppers 41 and 42 each have a diameter larger than that of the body shaft 39.

The reason for rotationally coupling the fork 70 to the operation knob 60 is to reduce the size of the cutout 37 in the first upstream fin 31. In other words, if the fork 70 did not rotate relative to the operation knob 60, the vertical size of the cutout 37 would need to be lengthened in order to prevent the contact between the fork 70 and the upstream body 33 of the first upstream fin 31 when the operation knob 60, which is largely pivoted about the downstream fin shafts 24, slides on the downstream body 23.

If the cutout 37 were enlarged, the upstream body 33 of the first upstream fin 31 would lose an area for changing the flow direction of the air-conditioning air A1, accordingly. This would reduce the directionality of the air-conditioning air A1 when the first upstream fin 31 is inclined in relation to the flow direction of the air-conditioning air A1.

In addition, the cutout 37 is visible from the downstream side of the air-conditioning register when the first upstream fin 31 is inclined in relation to the flow direction. The cutout 37, which is visible from the downstream side, degrades the appearance of the first upstream fin 31. As the cutout 37 is enlarged, the appearance is worsened.

In contrast, the fork 70, which is rotationally coupled to the operation knob 60, allows the cutout 37 to be relatively small. This enables prevention of contact between the fork 70 and the upstream body 33 of the first upstream fin 31. Accordingly, the likelihood is limited that the cutout 37 will reduce the directionality of the air-conditioning air A1 and worsen the appearance of the first upstream fin 31.

The air-conditioning register according to the first embodiment is configured in the above-described manner. Operation of the air-conditioning register will now be described.

When at the closed position, the shut-off damper 50 closes the air passage 11. The flow of the air-conditioning air A1 is blocked in the air passage 11, and the flow of the air-conditioning air A1 delivered from the outlet port 12 is stopped.

When at the open position, the shut-off damper 50 fully opens the entire air passage 11. The flow of the air-conditioning air A1 is divided into the left side and the right side of the shut-off damper 50 in the vehicle widthwise direction (refer to FIG. 3). After passing through the shut-off damper 50, the air-conditioning air A1 flows along the first and second upstream fins 31 and 32 and the first and second downstream fins 21 and 22, and is then sent out from the outlet port 12.

The position of the shut-off damper 50 is switched from the closed position to the open position or from the open position to the closed position through rotational operation of an operation dial 15 (refer to FIGS. 1 and 5A). The operation dial 15 is arranged at the downstream end of the case 10. When the occupant operates the operation dial 15 to rotate, the rotational movement of the operation dial 15 is transmitted to the shut-off damper 50 via a damper driving mechanism (not shown) so that the shut-off damper 50 pivots.

In the following description, the shut-off damper 50 is assumed to be at the open position.

FIG. 3 and FIGS. 5A and 5B show the air-conditioning register, in which the first and second upstream fins 31 and 32 are arranged substantially in parallel to the vertical walls 13, and the first and second downstream fins 21 and 22 are arranged substantially in parallel to the lateral walls 14. The operation knob 60 is positioned in the middle part in the longitudinal direction (the vehicle widthwise direction) of the downstream body 23 and maintains the horizontal state. After passing through the shut-off damper 50, the air-conditioning air A1 flows without changing the direction by the first and second upstream fins 31 and 32 and the first and second downstream fins 21 and 22, and is then sent out straight from the outlet port 12.

From the above state, when the operation knob 60 slides on the downstream body 23 of the first downstream fin 21 in the vehicle widthwise direction, the movement of the operation knob 60 is transmitted to the first upstream fin 31 via the fork 70 and the transmission shaft 38. The transmission shaft 38 is pushed by one of the transmission pieces 72 of the fork 70 that is located backward in the sliding direction of the operation knob 60. Accordingly, the first upstream fin 31 pivots about the upstream fin shafts 34 in the same direction as the sliding direction of the operation knob 60 (the vehicle widthwise direction). The pivoting movement of the first upstream fin 31 is transmitted to all the second upstream fins 32 via the second link mechanism LM2. As a result, all the second upstream fins 32 move with the first upstream fin 31 and pivot about the respective upstream fin shafts 34 in the same direction as the pivoting direction of the first upstream fin 31. The first downstream fin 21 does not pivot at this time. The flow direction of the air-conditioning air A1 is changed by the upstream bodies 33 of the pivoted first and second upstream fins 31 and 32.

In this state, the angle of the upstream body 33 of the first upstream fin 31 in relation to the fork 70 is changed. However, since the change in the angle takes place in the cutout 37, the upstream body 33 and the fork 70 are prevented from contacting each other.

When force in the thickness direction, e.g., upward force, is applied to the downstream end of the operation knob 60, the force is transmitted to the first downstream fin 21. The first downstream fin 21 pivots counterclockwise about the downstream fin shafts 24 as viewed in FIG. 5B.

The pivoting movement of the first downstream fin 21 is transmitted to all the second downstream fins 22 via the first link mechanism LM1. As a result, all the second downstream fins 22 move with the first downstream fin 21 and pivot about the respective downstream fin shafts 24 in the same direction as the pivoting direction of the first downstream fin 21. The flow direction of the air-conditioning air A1 is changed diagonally upward by the downstream bodies 23 of the pivoted first and second downstream fins 21 and 22.

With the above operation, the support shafts 71 of the fork 70 rotate counterclockwise around the downstream fin shafts 24 of the first downstream fin 21. Since the support shafts 71 are frictionally engaged with the shaft hole 64 of the operation knob 60 (refer to FIG. 3), the fork 70 acts to move along the transmission shaft 38 while maintaining the orientation. With the movement, the transmission pieces 72 contact the second stopper 42, which is the lower one of the first and second stoppers 41 and 42.

Figure 11:
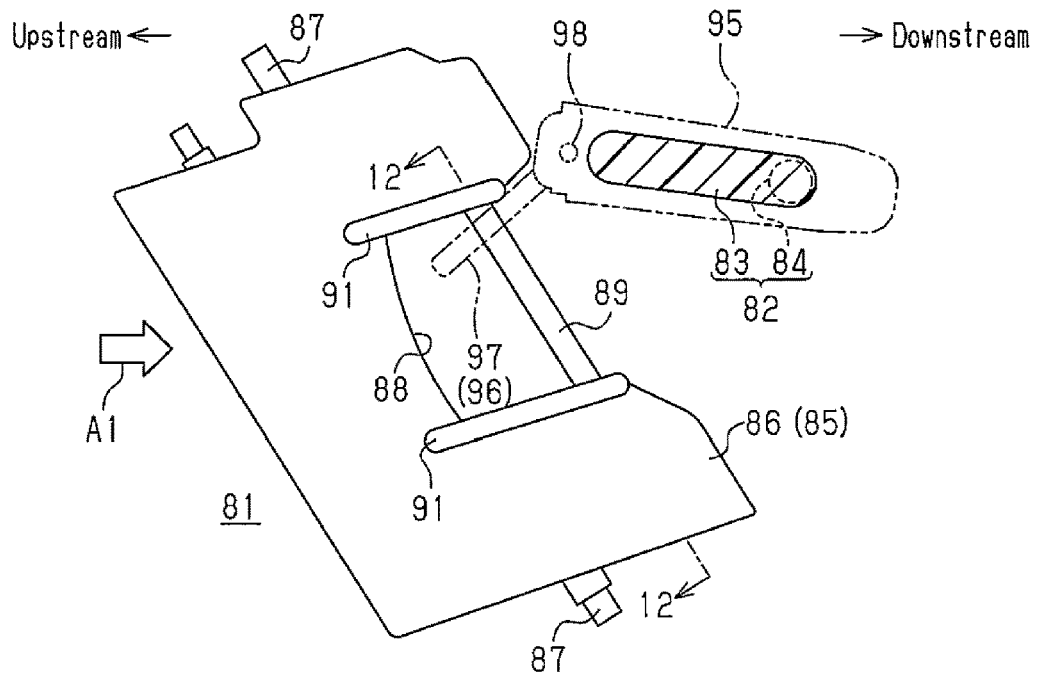
FIG. 11 is a cross-sectional side view of a conventional air-conditioning register, illustrating the positional relationship among an upstream fin, a downstream fin, an operation knob, and a fork.
Figure 12:
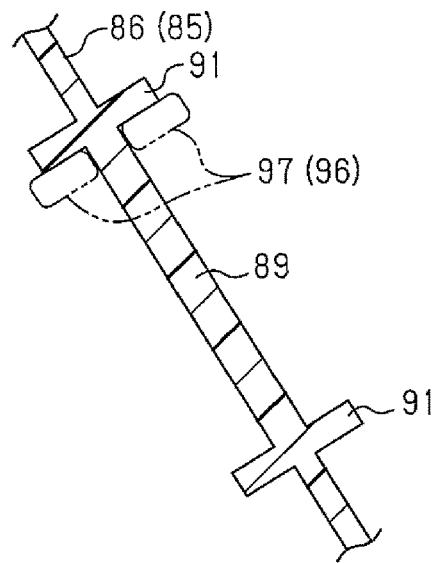
FIG. 12 is a cross-sectional view showing a part taken along line 12-12 of FIG. 11.

The first and second stoppers 41 and 42 are arranged on the transmission shaft 38 and located at positions that sandwich the transmission pieces 72 from above and below. Thus, the transmission pieces 72 have a narrow movable range in comparison with the conventional configuration, in which the flanges 91 are arranged in portions of the upstream body 86 that border the cutout 88 (refer to FIG. 11). This inhibits the transmission pieces 72 from strongly striking the second stopper 42.

Particularly, in the first embodiment, the first and second stoppers 41 and 42 are close to each other and close to the transmission pieces 72. Thus, when the operation knob 60 is operated to move upward in the thickness direction even a slight amount, the transmission pieces 72 contact the lower second stopper 42. This effectively inhibits the transmission pieces 72 from strongly striking the second stopper 42.

If the above operation of the operation knob 60 continues even after the transmission pieces 72 contact the lower second stopper 42, the fork 70 tilts clockwise about the contacting part with the second stopper 42 as shown in FIG. 6A. This changes the angle of the fork 70 in relation to the operation knob 60.

From this state, when downward force, which is force in the reverse direction to the above, is applied to the downstream end of the operation knob 60, the force is transmitted to the first downstream fin 21. As a result, the first downstream fin 21 pivots clockwise about the downstream fin shafts 24 as viewed in FIG. 6A.

The pivoting movement of the first downstream fin 21 is transmitted to all the second downstream fins 22 via the first link mechanism LM1. As a result, all the second downstream fins 22 move with the first downstream fin 21 and pivot about the respective downstream fin shafts 24 in the same direction as the pivoting direction of the first downstream fin 21. The flow direction of the air-conditioning air A1 is changed by the downstream bodies 23 of the pivoted first and second downstream fins 21 and 22.

With the above operation, the support shafts 71 of the fork 70 rotate counterclockwise around the downstream fin shafts 24 of the first downstream fin 21. The fork 70 acts to move along the transmission shaft 38 while maintaining the orientation, which has been changed by contacting the second stopper 42. With the movement, the transmission pieces 72 contact the first stopper 41, which is the upper one of the first and second stoppers 41 and 42. However, the tapping noise produced by the contact between the transmission pieces 72 and the first stopper 41 is reduced in the same manner as above.

If the above operation of the operation knob 60 continues even after the transmission pieces 72 contact the upper first stopper 41, the fork 70 tilts counterclockwise about the contacting part with the first stopper 41 as shown in FIG. 6B.

This changes the angle of the fork 70 in relation to the operation knob 60.

The first upstream fin 31 does not pivot when the operation knob 60 is operated in the above-described manner to move in the thickness direction.

The above-illustrated first embodiment achieves the following advantages.

(1) The first and second stoppers 41 and 42 arranged on the transmission shaft 38 of the first upstream fin 31 are spaced from each other in the extending direction of the transmission shaft 38 and located at positions that sandwich the transmission pieces 72 of the fork 70. The first and second stoppers 41 and 42 contact the transmission pieces 72 with the operation of the operation knob 60 (FIG. 4 and FIG. 5B).

This reduces the tapping noise produced by the fork 70 when the operation knob 60 is operated to pivot the first downstream fin 21.

(2) The first and second stoppers 41 and 42 are arranged at locations that are close to each other in the extending direction of the transmission shaft 38 and that are close to the transmission pieces 72 (FIG. 4 and FIG. 5B).

This effectively inhibits the transmission pieces 72 from strongly striking the first and second stoppers 41 and 42, and further reduces the tapping noise produced by the contact.

In addition, the movable range of the transmission pieces 72 is reduced to the minimum range as much as possible so that the size of the cutout 37 is effectively reduced in the first upstream fin 31. Accordingly, the likelihood is limited that the cutout 37 will reduce the directionality of the air-conditioning air A1 and worsen the appearance of the first upstream fin 31.

Second Embodiment

An air-conditioning register for a vehicle according to a second embodiment will now be described mainly with respect to differences from the first embodiment with reference to FIGS. 7A to 10B.

Figure 7A:
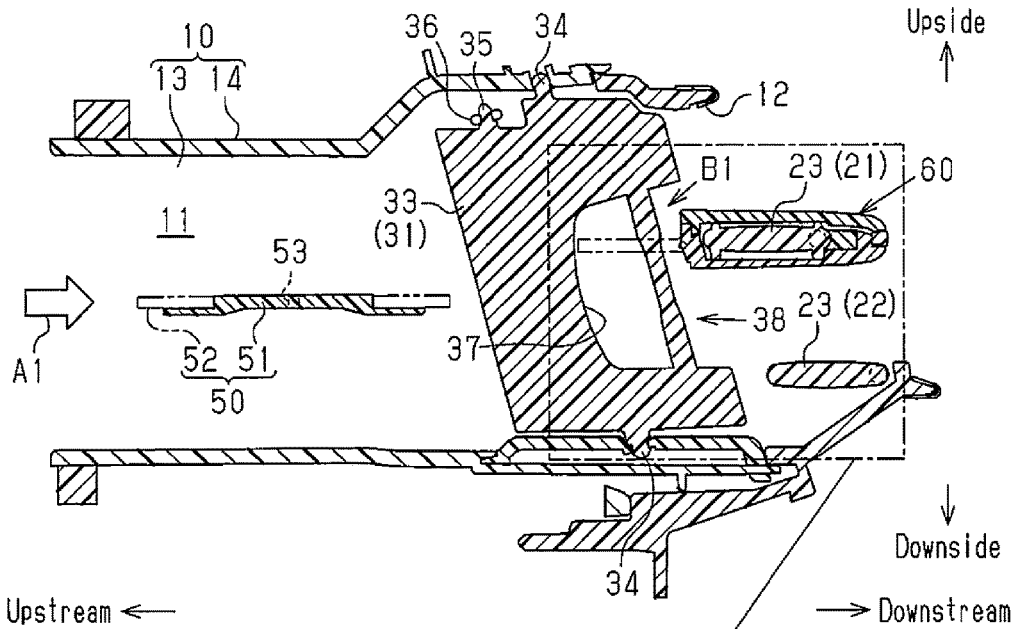
FIG. 7A is a cross-sectional side view of an air-conditioning register according to a second embodiment, in which an operation knob is arranged horizontally.
Figure 7B:
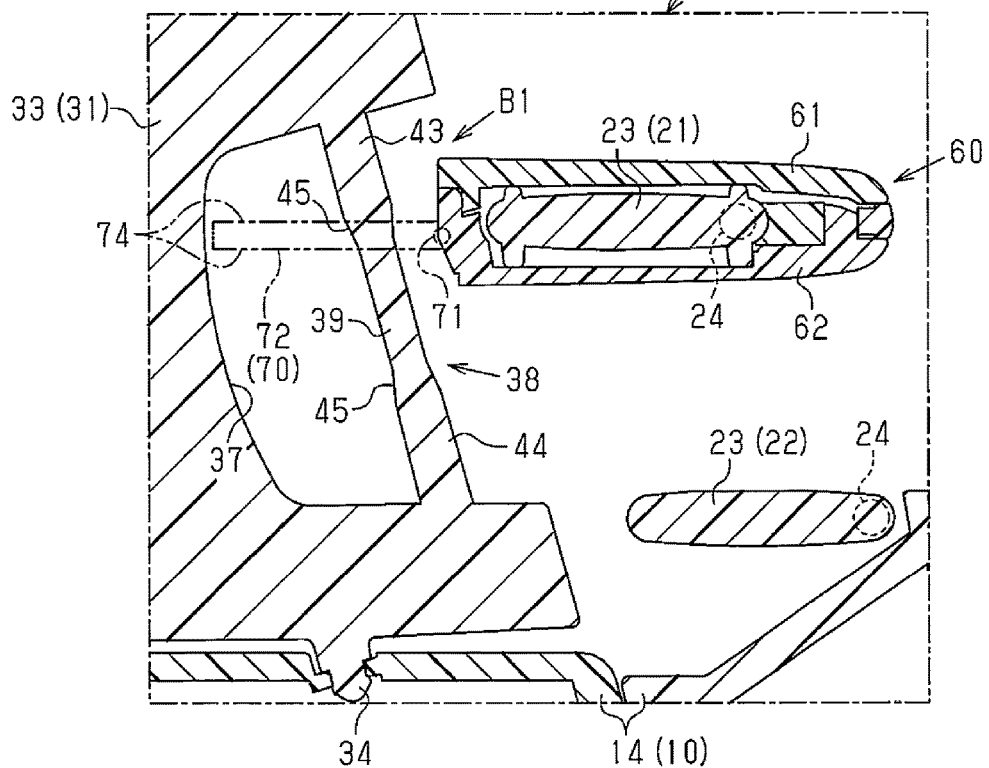
FIG. 7B is an enlarged cross-sectional side view showing a part of FIG. 7A.

As shown in FIGS. 7A and 7B, the outlet port 12 according to the second embodiment has a vertical size set smaller than that according to the first embodiment. Along with that, the number of second downstream fins 22 is reduced. The first and second upstream fins 31 and 32 are arranged closer to the downstream fins 21 and 22 than those according to the first embodiment. The transmission shaft 38 is arranged at a location that is far from the downstream end of the cutout 37 toward the upstream.

Figure 10A:
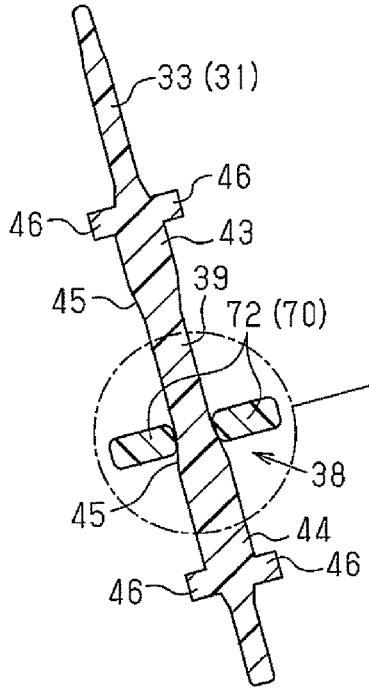
FIG. 10A is a cross-sectional view showing a part of the air-conditioning register of FIG. 7A, illustrating the positional relationship among a transmission shaft, stoppers, transmission pieces of a fork, and the like, which corresponds to FIG. 4.
Figure 10B:
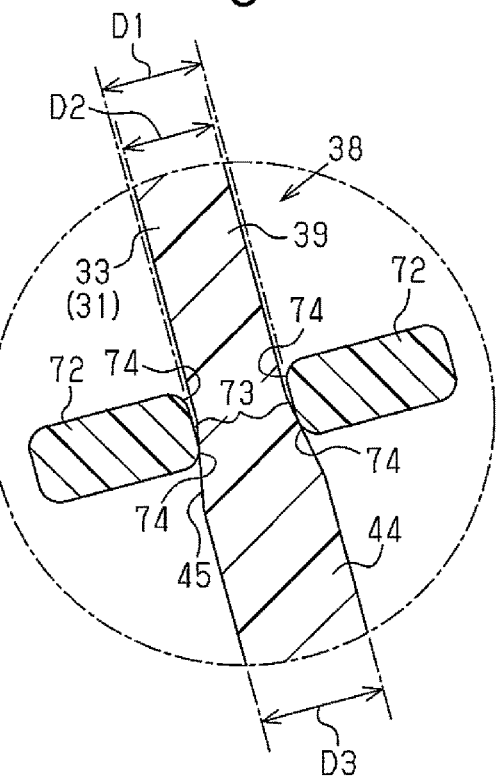
FIG. 10B is an enlarged cross-sectional view showing a part of FIG. 10A.

As shown in FIG. 10B, the surfaces of the transmission pieces 72 that face each other are referred to as facing surfaces 73. The boundaries (corners) of each facing surface 73 with the opposite surfaces in the thickness direction of the corresponding transmission piece 72 are referred to as facing edges 74.

Figure 9:
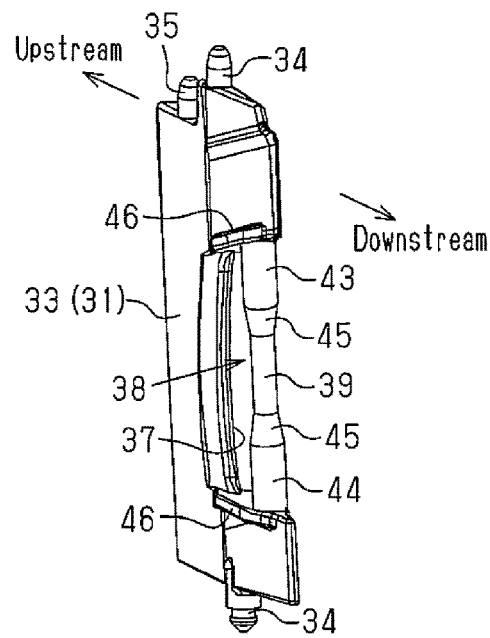
FIG. 9 is a perspective view of an upstream fin located in the middle part of the air-conditioning register of FIG. 7A.

As shown in FIG. 9 and FIGS. 10A and 10B, the middle portion of the transmission shaft 38 constitutes the columnar body shaft 39. The body shaft 39 is set to be longer than that according to the first embodiment. The upper portion from the body shaft 39 of the transmission shaft 38 constitutes a first stopper 43. The lower portion from the body shaft 39 of the transmission shaft 38 constitutes a second stopper 44. The first and second stoppers 43 and 44 are each connected to a portion of the upstream body 33 that borders the cutout 37 in the first upstream fin 31.

The portions of the first and second stoppers 43 and 44 that border the body shaft 39 constitute contact surfaces 45.

The facing edges 74 of each transmission piece 72 contact the respective contact surfaces 45. Each contact surface 45 is formed to have a truncated conical shape so that the diameter gradually increases as the distance from the body shaft 39 increases.

Figure 8A:
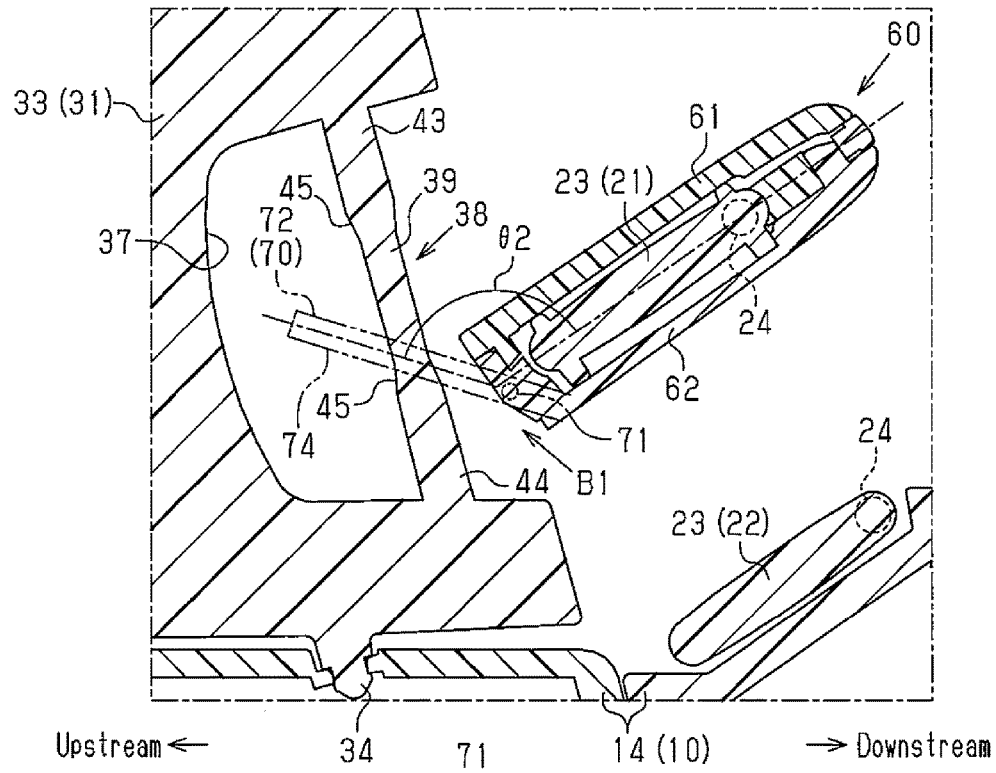
FIG. 8A and FIG. 8B are cross-sectional side views showing a part of the air-conditioning register, in which the operation knob that has been in the state of FIG. 7B is operated in the thickness direction to pivot the downstream fin.
Figure 8B:
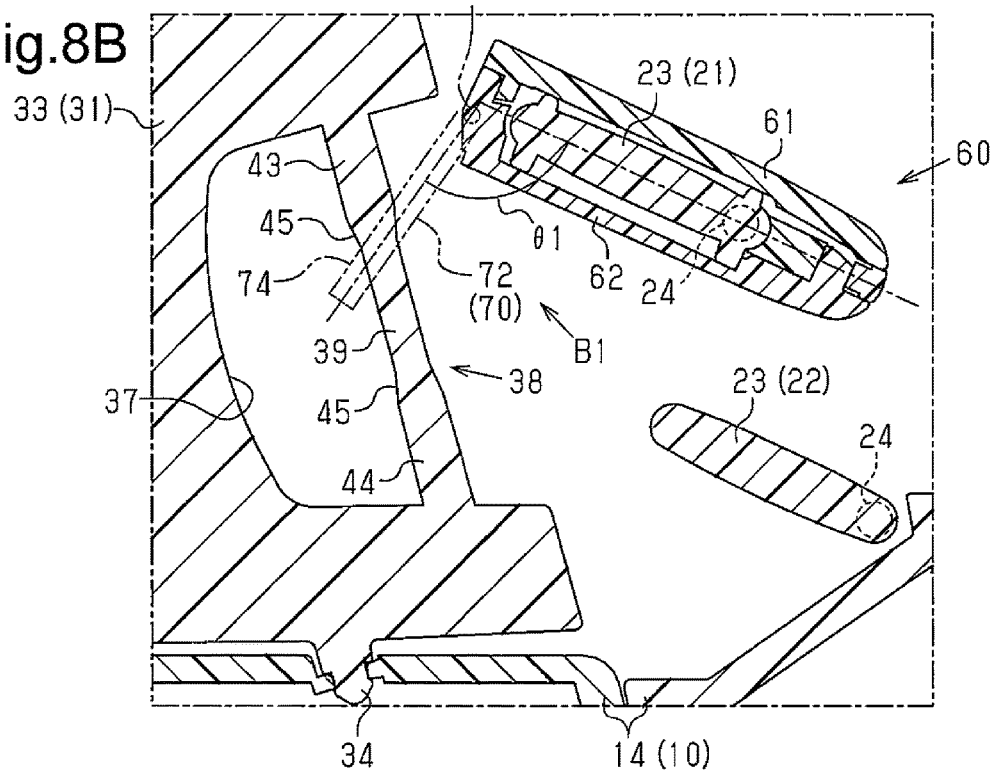

As shown in FIG. 8B, the angle of the fork 70 in relation to the operation knob 60 is defined as $\theta 1$. The transmission shaft 38 according to the second embodiment has the upper first stopper 43 positioned such that the angle $\theta 1$ is equal to or greater than 90° when the operation knob 60 is most inclined to lower the downstream portion. This is because the fork 70 is difficult to return to the position in parallel to the operation knob 60 or to a position close to that if the angle $\theta 1$ becomes less than 90°. As shown in FIG. 8A, the angle of the fork 70 in relation to the operation knob 60 is defined as $\theta 2$. The transmission shaft 38 has the lower second stopper 44 positioned such that the angle $\theta 2$ is substantially 130° when the operation knob 60 is most inclined to heighten the downstream portion. This is for a better appearance of the fork 70 when the air-conditioning register with the slightly inclined (nearly horizontal) fork 70 is seen from the downstream side.

As shown in FIG. 10B, the space D1 between the transmission pieces 72 is set substantially at 2.7 mm. For the better appearance, the diameter D2 of the body shaft 39 is set substantially at 2.5 mm, and the diameter D3 for the stoppers 43 and 44 is set substantially at 3.5 mm.

As shown in FIG. 9 and FIG. 10A, a bulging portion 46 is arranged in each portion of the upstream body 33 that borders the first and second stoppers 43 and 44 in the first upstream fin 31. Each bulging portion 46 bulges from the opposite sides in the thickness direction of the upstream body 33 and has distal ends that face each other in the thickness direction of the upstream body 33. The space between the distal ends is set to be larger than the diameter D3 for the first and second stoppers 43 and 44.

As shown in FIG. 7A, the shafts 53 of the shut-off damper 50 are arranged on the opposite end surfaces in the vehicle widthwise direction of the body 51. The shut-off damper 50 is supported by the vertical walls 13 with the shafts 53, and is pivotal between at the open position and the closed position. The shut-off damper 50 at the open position is substantially in parallel to the lateral walls 14 to widely open the air passage 11. The shut-off damper 50 at the closed position is largely inclined in relation to the lateral walls 14, and the sealing portion 52 contacts the lateral walls 14 and the vertical walls 13 to close the air passage 11.

The other configuration is the same as the configuration according to the first embodiment. Thus, like or the same reference numerals are given to those components that are like or the same as the corresponding components of the above-illustrated first embodiment, and repeated descriptions are omitted.

Operation of the above-illustrated air-conditioning register according to the second embodiment will now be described.

FIG. 7B shows the operation knob 60, which is arranged substantially horizontal. When force in the thickness direction, e.g., upward force, is applied to the downstream end of the operation knob 60, the force is transmitted to the first downstream fin 21. The first downstream fin 21 pivots counterclockwise about the downstream fin shafts 24 as viewed in FIG. 7B.

As shown in FIG. 8A, the support shafts 71 of the fork 70 rotate counterclockwise around the downstream fin shafts 24 of the first downstream fin 21 with the above operation. The fork 70 acts to move downward along the body shaft 39 of the transmission shaft 38 while maintaining the orientation.

With the movement, the transmission pieces 72 contact the lower second stopper 44.

The space between the first and second stoppers 43 and 44 is set to be wider than the space between the first and second stoppers 41 and 42 according to the first embodiment. Thus, the movable range for the transmission pieces 72 is wider than that according to the first embodiment. However, the movable range is narrower than that in the conventional configuration, in which the flanges 91 are arranged in portions of the upstream body 86 that border the cutout 88 (refer to FIG. 11). This inhibits the transmission pieces 72 from strongly striking the second stopper 44 to reduce the tapping noise produced by the contact.

The contact surface 45 of the second stopper 44 is formed to have a truncated conical shape so that the diameter increases as the distance from the body shaft 39 increases. Thus, each transmission piece 72 smoothly makes line contact with the contact surface 45 of the second stopper 44 at the corresponding facing edge 74. Since the line contact is the source of tapping noise with contact between the transmission pieces 72 and the second stopper 44, the sound is softer than that with surface contact. Thus, the tapping noise produced by operation of the operation knob 60 is reduced.

As shown in FIG. 8A, the fork 70 tilts clockwise about the contacting part with the lower second stopper 44 if the above operation of the operation knob 60 continues even after the transmission pieces 72 contact the lower second stopper 44. This changes the angle θ2, which is the angle of the fork 70 in relation to the operation knob 60.

From this state, when downward force is applied to the downstream end of the operation knob 60, the force is transmitted to the first downstream fin 21. As a result, the first downstream fin 21 pivots clockwise about the downstream fin shafts 24 as viewed in FIG. 8A.

With the above operation, the support shafts 71 of the fork 70 rotate clockwise around the downstream fin shafts 24. The fork 70 acts to move upward along the transmission shaft 38 while maintaining the orientation, which has been changed by contacting the second stopper 44. With the movement, the transmission pieces 72 smoothly make line contact with the tapered contact surface 45 of the upper first stopper 43 at the corresponding facing edges 74. The tapping noise produced by this contact is also reduced in the same manner as above.

As shown in FIG. 8B, the fork 70 tilts counterclockwise about the contacting part with the upper first stopper 43 if the above operation of the operation knob 60 continues even after the transmission pieces 72 contact the upper first stopper 43. This changes the angle θ1, which is the angle of the fork 70 in relation to the operation knob 60.

If the force applied to the transmission pieces 72 is so excessive that the transmission pieces 72 go past the corresponding tapered contact surface 45, the transmission pieces 72 slide on the corresponding one of the first and second stoppers 43 and 44. However, the transmission pieces 72 contact the corresponding bulging portion 46. This restricts the transmission pieces 72 to further move toward the corresponding bulging portion 46.

The above-illustrated second embodiment achieves the following advantages in addition to a similar advantage to the advantage (1).

(3) The first and second stoppers 43 and 44 each include the contact surface 45, which contact the corresponding facing edges 74 of the transmission pieces 72 (FIG. 9 and FIGS. 10A and 10B).

This allows the transmission pieces 72 to make line contact with the corresponding contact surface 45. Since the line contact is the source of a tapping noise with operation of the operation knob 60, the sound is softer than that with surface contact.

(4) The portion between the first and second stoppers 43 and 44 of the transmission shaft 38 is formed by the columnar body shaft 39. The portions of the first and second stoppers 43 and 44 that border the body shaft 39 constitute the contact surfaces 45 described in the above (3). Each contact surface 45 is formed to have a truncated conical shape so that the diameters increase as the distance from the body shaft 39 increases (FIG. 9 and FIGS. 10A and 10B).

This allows the transmission pieces 72 to smoothly make line contact with the corresponding tapered contact surface 45 in the first and second stoppers 43 and 44 at the corresponding facing edges 74. Thus, the advantage (3) is achieved.

Furthermore, the diameter of the body shaft 39 is different from the diameters of the first and second stoppers 43 and 44, and the tapered contact surfaces 45, which have gradually changing diameters, are arranged between the body shaft 39 and the first and second stoppers 43 and 44. This enhances the appearance of the transmission shaft 38 since the diameter of the transmission shaft 38 does not drastically change in a portion.

(5) The first and second stoppers 43 and 44 are each connected to a portion of the upstream body 33 that borders the cutout 37 in the first upstream fin 31. Each of the portions of the upstream body 33 that border the first and second stoppers 43 and 44 includes the bulging portion 46, which bulges from the opposite sides in the thickness direction of the upstream body 33 (FIG. 9 and FIG. 10A)

This inhibits the transmission pieces 72 from coming off from the first upstream fin 31 even if the transmission pieces 72 go past the corresponding tapered contact surface 45 with excessive force applied in the thickness direction of the fork 70.

The above-illustrated embodiments may be modified in the following forms.

The diameters of the first and second stoppers 41 and 42 according to the first embodiment may be the same or different.

Similarly, the diameters of the first and second stoppers 43 and 44 according to the second embodiment may be the same or different.

In the transmission shaft 38 according to the second embodiment, a portion above the first stopper 43 may have a smaller diameter than that of the first stopper 43. In the transmission shaft 38, a portion below the second stopper 44 may have a smaller diameter than that of the second stopper 44.

In the above-illustrated second embodiment, the bulging portions 46 may be omitted.

In the above-illustrated embodiments, the first and second downstream fins 21 and 22 each include the downstream body 23 and the downstream fin shafts 24. The downstream body 23 and the downstream fin shafts 24 each may be arranged to extend substantially in the vertical direction. In this case, the first and second upstream fins 31 and 32 each may include the upstream body 33 and the upstream fin shafts 34, which are each arranged to extend substantially in the vehicle widthwise direction.

The above-illustrated air-conditioning register is usable as an air-conditioning register incorporated in a portion different from the instrument panel of the passenger compartment.

The above-illustrated air-conditioning register is applicable not only to a vehicle but also to a variety of purposes as long as a fin changes the flow direction of the air-conditioning air supplied from an air conditioner and the like and delivered into the passenger compartment.

The invention claimed is:

1. An air-conditioning register comprising:
    a downstream fin including a downstream body and a downstream fin shaft, which are located in an extending direction crossing a flow direction of air-conditioning air, wherein the downstream fin is supported to pivot about the downstream fin shaft;
    an upstream fin including
        an upstream body and an upstream fin shaft, wherein each of the upstream body and the upstream fin shaft extends in a direction that crosses both the flow direction and the extending direction of the downstream fin shaft,
        a cutout formed in the upstream body to extend upstream from a downstream edge of the upstream body, and
        a transmission shaft that is located in the cutout to extend along the upstream fin shaft, wherein the upstream fin is located upstream of the downstream fin and supported to pivot about the upstream fin shaft;
    an operation knob arranged to slide relative to the downstream body in the extending direction of the downstream body;
    a fork including a pair of transmission pieces that extend upstream from the operation knob and that sandwich the transmission shaft, wherein the fork is supported with a support shaft to be rotational relative to the operation knob; and
    a pair of stoppers arranged on the transmission shaft, wherein the stoppers are spaced from each other in the extending direction of the transmission shaft and located at positions that sandwich the transmission pieces, the stoppers are caused to contact the transmission pieces by operation of the operation knob, and the pair of stoppers limits a movable range of the transmission pieces to a distance between the pair of stoppers, wherein
    each transmission piece includes a facing edge that contacts the corresponding stopper,
    each stopper includes a contact surface that contacts the facing edge of the corresponding transmission piece,
    a portion of the transmission shaft between the stoppers includes a columnar body shaft,
    the contact surface of each stopper is formed by a portion of the stopper that borders the body shaft,
    the contact surface of each stopper is formed to have a truncated conical shape so that a diameter increases as a distance from the body shaft increases,
    each stopper is connected to a portion of the upstream body that borders the cutout, and
    the upstream body includes bulging portions, each of which bulges from opposite sides in a thickness direction of the upstream body and is formed at a portion of the upstream body that borders one of the stoppers.

2. An air-conditioning register comprising:
    a downstream fin including a downstream body and a downstream fin shaft, which are located in an extending direction crossing a flow direction of air-conditioning air, wherein the downstream fin is supported to pivot about the downstream fin shaft;
    an upstream fin including
        an upstream body and an upstream fin shaft, wherein each of the upstream body and the upstream fin shaft extends in a direction that crosses both the flow direction and the extending direction of the downstream fin shaft,
        a cutout formed in the upstream body to extend upstream from a downstream edge of the upstream body, and
        a transmission shaft that is located in the cutout to extend along the upstream fin shaft, wherein the upstream fin is located upstream of the downstream fin and supported to pivot about the upstream fin shaft;
    an operation knob arranged to slide relative to the downstream body in the extending direction of the downstream body;
    a fork including a pair of transmission pieces that extend upstream from the operation knob and that sandwich the transmission shaft, wherein the fork is supported with a support shaft to be rotational relative to the operation knob; and
    a pair of stoppers arranged on the transmission shaft, wherein the stoppers are spaced from each other in the extending direction of the transmission shaft and located at positions that sandwich the transmission pieces, the stoppers are caused to contact the transmission pieces by operation of the operation knob, and the pair of stoppers limits a movable range of the transmission pieces to a distance between the pair of stoppers, wherein
    each stopper includes a contact surface that contacts the transmission pieces,
    a portion of the transmission shaft between the stoppers includes a columnar body shaft,
    the contact surface of each stopper is formed by a portion of the stopper that borders the body shaft, and
    the contact surface of each stopper is formed to have a truncated conical shape so that a diameter increases as a distance from the body shaft increases.

* * * * *